E. BAUER.
SYSTEM OF ELECTRICAL DISTRIBUTION.
APPLICATION FILED JULY 17, 1916.
1,289,362.
Patented Dec. 31, 1918.
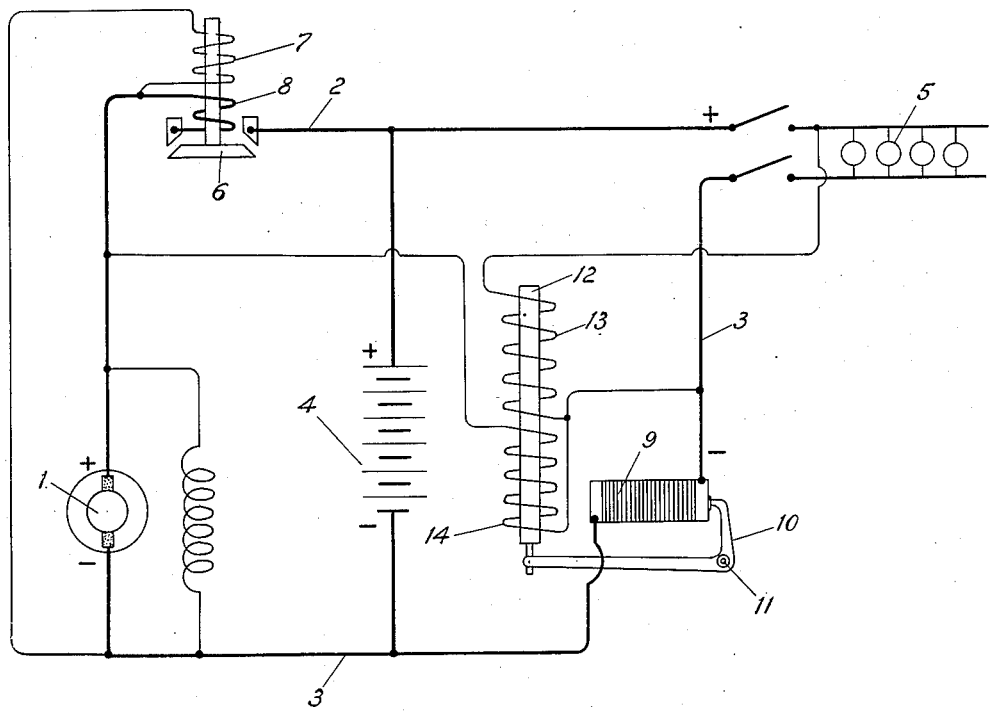
Witnesses
David H. Tinkler.
Ralph Munden.
Inventor
Ernst Bauer
By Raymond H. Van Vleet,
Attorney

UNITED STATES PATENT OFFICE.

ERNST BAUER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,289,362.

Specification of Letters Patent.

Patented Dec. 31, 1918.

Application filed July 17, 1916. Serial No. 109,614.

*To all whom it may concern:*

Be it known that I, ERNST BAUER, a citizen of the United States, residing at Niagara Falls, in the county of Niagara and State of New York, have invented new and useful Improvements in Systems of Electrical Distribution, of which the following is a specification.

This invention relates to systems of electrical distribution.

More particularly the invention relates to car-lighting systems in which the generator, driven by the car axle, supplies a variable voltage for charging a storage battery and supplying a translation circuit.

The storage battery and translation circuit are connected in parallel branches across the generator terminals. Inasmuch as it is necessary to impress a higher voltage upon the battery for charging same than said battery will deliver upon discharge, it is necessary to provide some means for cutting down the voltage on the translating devices when the generator is operating. It is common practice to utilize for this purpose a variable resistance which will maintain the voltage across the translation devices substantially constant, regardless of changes in voltage at the generator terminals.

When the battery alone is supplying the translating devices, it may be necessary to operate the variable resistance to cut down the battery discharging voltage to the voltage desired across the translating devices. When the generator is operating, it will be necessary to operate said variable resistance through a much larger range. When the battery is on discharge, with the generator at rest, it is desirable to be able to reduce the variable resistance to a minimum. It is common practice to operate the variable resistance by means of the magnetizing action of electrical windings. In order to reduce the variable resistance to a minimum, it is necessary to remove some of the effect of the electrical windings. The present invention relates to means for accomplishing this result.

One of the objects of the present invention is to provide a car lighting system having an automatic regulator for the lamp circuit in which the standard of operation of the operating means for said regulator will be varied, depending upon whether the storage battery or the generator is supplying said lamps.

A further object is to provide a system involving a variable speed generator, a storage battery and a translation circuit, said translation circuit being provided with regulating means controlled in different manners, depending upon the operativeness of the generator, the transition between the modes of control being effected in such manner as to avoid flickering of the lights.

A further object is to provide a system in which the connections of the operating means for the lamp regulator are controlled in response to the action of the automatic switch.

A further object is to provide a system of the kind above referred to which is devoid of complications and little liable to get out of order.

Further objects will be apparent as the description proceeds.

The one figure of the drawing is a diagrammatic view illustrating one embodiment of the invention.

The variable speed generator is indicated by the numeral 1. This generator may be driven by a car axle. The generator 1 supplies leads 2 and 3, across which the storage battery 4 and lamps 5 are connected in parallel. The lead 2 is provided with an automatic switch 6 which may be of any preferred construction. It is provided with an operating coil 7 connected across the terminals of the generator 1 and it is also provided with the usual holding coil 8 connected in series with the lead 2. The automatic switch 6 will close when a predetermined voltage is impressed across the generator terminals. This voltage will be chosen at a value sufficient for charging the storage battery 4. Should the voltage of the generator 1 decrease below said predetermined value, the battery will tend to discharge through said generator, reversing the polarity of the series coil 8, whereby coils 7 and 8 will be in opposition and the automatic switch will open.

Connected in the lead 3 between the storage battery 4 and the lamps 5 is a regulator 9, indicated as a carbon pile. The carbon pile 9 is operated by means of a bell crank lever 10, pivoted at the point 11. The bell crank lever 10 is operated by the core 12, which core is provided with a pair of operating coils 13 and 14. It will be apparent from the drawing that when the core 12 is attracted in an upward direction by the coils 13 and 14, pressure will be released from the carbon pile 9, increasing the resistance thereof. Conversely, when the core 12 is allowed to sink to its lowermost position, the carbon pile will be compacted, decreasing the resistance thereof.

It will be noted that the operating coil 13 is connected directly across the lamps 5 and is at all times responsive to voltage changes thereacross. The operating coil 14 is connected across the system between the lead 3 and the lead 2. It will be noted, however, that the connection with the lead 2 is on the generator side of the automatic switch 6, whereby when said automatic switch 6 is open, as when the generator is inoperative, the operating coil 14 will be disconnected from the lamp circuit and will be energized only in proportion to the voltage being developed by the generator which, at the time that the automatic switch is open, is less than the voltage of the storage battery and less than the voltage impressed across solenoid 13.

A mode of operation of the above described embodiment of the invention is substantially as follows:

Starting with the generator operative and the automatic switch closed, the operating coils 13 and 14 will act cumulatively to control the carbon pile 9 to maintain a substantially constant voltage across the lamps 5. When the generator becomes inoperative, as when the train slows down, the automatic switch will open and the storage battery 4 will supply the lamps 5 but at a lower voltage than was delivered by the generator 1. It may be necessary to control the voltage delivered by the battery, as in the case of a freshly charged battery when the voltage may be slightly higher than normal. Such excess voltage of the battery will be cut down by the carbon pile 9 acting under the influence of the coil 13. The coil 14 at this time is energized in proportion to the voltage developed by the generator and as the generator slows down to rest, the effect of coil 14 will be reduced to zero. The reduction in the effect of coil 14 permits the core 12 to sink, whereby the bell crank lever 10 may exert its maximum pressure on the carbon pile 9. When the generator again becomes operative, the automatic switch will close and the coils 13 and 14 will again act cumulatively to control the carbon pile. There will be no sudden increase in the pull on core 12, inasmuch as the energization of coil 14 has increased as the generator voltage increased to the point necessary to close the automatic switch.

One embodiment of the present invention has been described in detail. Various modifications will occur to those skilled in the art. It is intended to include in this case all such modifications as fall within the scope of the invention as defined by the appended claims.

What I claim as new and desire to secure by Letters Patent of the United States is:—

1. In a car lighting system, in combination, a variable source of electrical supply, a storage battery and a translation circuit, regulating means for said translation circuit, a pair of operating coils for said regulating means, and means whereby the effect of one of said coils is gradually changed as the voltage of said source varies between zero and a value sufficient for charging said battery.

2. In a car lighting system, in combination, an automatic switch, a translation circuit, regulating means for said translation circuit, and a pair of operating means for said regulating means, one of which is connected across said system on one side of said automatic switch and the other of which is connected across said system on the other side of said automatic switch.

3. In combination, a generator, a pair of leads, a storage battery and lamp circuit connected in parallel across said leads, an automatic switch in one of said leads between said generator and said battery, a regulator for said lamp circuit, a pair of operating coils for said regulator, an end of each coil being connected to one lead on opposite sides of the automatic switch and the remaining ends being connected to the other lead.

4. In combination, varying potential leads, a storage battery and a lamp circuit connected thereacross in parallel, an automatic switch in one of said leads, a regulator for said lamp circuit, and a plurality of operating coils therefor, one of said coils being connected between one side of said lamp circuit and to one of said leads on the side of said automatic switch remote from said lamp circuit.

5. In a car lighting system, in combination, a generator, a storage battery, an automatic switch responsive to the generator voltage, and a lamp circuit, a regulator for said lamp circuit, controlling means for said regulator, the standard of said controlling means being gradually variable as the generator voltage varies between zero and the voltage necessary to close the automatic switch.

6. In a car lighting system, in combination, a variable source of electrical supply, a storage battery and a translation circuit, regulating means for said translation circuit, operating means for said regulating means, and means whereby the standard of said operating means is gradually changed when the voltage of the source is below a predetermined value.

7. In a car-lighting system, variable potential leads, an automatic switch, a storage battery, a lamp circuit, a regulator for said lamp circuit, two operating coils for said regulator, one terminal of each coil being connected on opposite sides of said automatic switch on one side of the system, the other terminals of said coils being connected to the other side of the system.

8. In a car lighting system, in combination, a variable source of electrical supply, a storage battery and a translation circuit, regulating means for said translation circuit, a pair of cumulatively acting operating coils for said regulating means connected across said translation circuit, and means for cutting out one of said coils from across said translation circuit when the voltage of the source is below a predetermined value and rendering same responsive to the voltage of said source.

In witness whereof, I have hereunto subscribed my name.

ERNST BAUER.